(12) United States Patent
Kamata

(10) Patent No.: US 10,953,776 B2
(45) Date of Patent: Mar. 23, 2021

(54) SEAT

(71) Applicant: TACHI-S CO., LTD., Akishima (JP)

(72) Inventor: Hideki Kamata, Akishima (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/355,781

(22) Filed: Mar. 17, 2019

(65) Prior Publication Data
US 2019/0381917 A1 Dec. 19, 2019

(30) Foreign Application Priority Data

Jun. 13, 2018 (JP) .............................. JP2018-112466

(51) Int. Cl.
B60N 2/60 (2006.01)
B60N 2/58 (2006.01)
B60N 2/70 (2006.01)

(52) U.S. Cl.
CPC ......... *B60N 2/5875* (2013.01); *B60N 2/5883* (2013.01); *B60N 2/70* (2013.01); *B60N 2/7017* (2013.01)

(58) Field of Classification Search
CPC .......... B60N 2/58; B60N 2/5875; B60N 2/70
See application file for complete search history.

(56) References Cited

U.S. PATENT DOCUMENTS

| | | | | |
|---|---|---|---|---|
| 4,534,595 A * | 8/1985 | Abe | ..................... | B60N 2/5875 297/452.61 |
| 4,699,427 A * | 10/1987 | Kobayashi | ......... | B29D 99/0092 297/452.27 |
| 4,867,508 A * | 9/1989 | Urai | ................... | B29D 99/0092 297/452.62 |
| 5,016,941 A * | 5/1991 | Yokota | ................. | B60N 2/5875 297/452.61 |
| 6,371,562 B1 * | 4/2002 | Yoshimura | ............ | B29C 44/569 156/245 |
| 6,592,181 B2 * | 7/2003 | Stiller | ................... | A47C 31/026 297/218.2 |
| 6,964,453 B1 * | 11/2005 | Flegal | .................. | B60N 2/5825 297/452.6 |
| 7,401,829 B2 * | 7/2008 | Michalski | ............... | B60R 13/02 112/418 |
| 7,549,708 B2 * | 6/2009 | Wieczorek | ............... | B60N 2/75 297/452.6 |
| 7,637,529 B2 * | 12/2009 | Tracht | ................... | B60R 21/207 280/728.2 |
| 7,837,263 B2 * | 11/2010 | Booth | ....................... | A47C 7/20 297/218.1 |
| 9,216,702 B1 * | 12/2015 | Mannor | ............. | B60R 13/0206 |

(Continued)

FOREIGN PATENT DOCUMENTS

JP 2017-030698 A 2/2017

*Primary Examiner* — Shin H Kim

(74) *Attorney, Agent, or Firm* — SGPatents PLLC

(57) ABSTRACT

The present invention provides a seat formed by bonding a trim cover to a foam pad, in which a sewing part of a trim cover can be bonded to a foam pad even when the trim cover is of leather. In a seat formed by bonding a trim cover to a foam pad, the trim cover includes a sewing part where plural trim covers are sewn up, raw material that is impregnated with an adhesive is sewn to the sewing part, and the foam pad and the raw material having been sewn are bonded to each other by the adhesive.

11 Claims, 2 Drawing Sheets

(56) References Cited

U.S. PATENT DOCUMENTS

| | | | |
|---|---|---|---|
| 9,630,538 B2 * | 4/2017 | Matsuhashi | B60N 2/60 |
| 10,611,276 B2 * | 4/2020 | Suzuki | B68G 7/052 |
| 2002/0101109 A1 * | 8/2002 | Stiller | B60N 2/5825 |
| | | | 297/452.6 |
| 2003/0042773 A1 * | 3/2003 | Stiller | B60N 2/5816 |
| | | | 297/218.3 |
| 2006/0113763 A1 * | 6/2006 | Tracht | B60R 21/207 |
| | | | 280/730.2 |
| 2007/0158981 A1 * | 7/2007 | Almasi | B60N 2/5614 |
| | | | 297/180.12 |
| 2007/0188007 A1 * | 8/2007 | Lazanja | B60N 2/5621 |
| | | | 297/452.42 |
| 2008/0309143 A1 * | 12/2008 | Booth | B60N 2/58 |
| | | | 297/452.56 |
| 2011/0049948 A1 * | 3/2011 | Hobl | B60N 2/5825 |
| | | | 297/218.2 |
| 2016/0031350 A1 * | 2/2016 | Smith | B60N 2/5833 |
| | | | 297/452.48 |
| 2017/0028887 A1 * | 2/2017 | Schulze | B60N 2/5833 |
| 2017/0151897 A1 * | 6/2017 | Nishikido | B60N 2/58 |
| 2018/0312087 A1 * | 11/2018 | Ishii | B60N 2/5883 |

* cited by examiner

SEAT

BACKGROUND OF THE INVENTION

1. Field of the Invention

The present invention relates to a seat that is formed by bonding skin material to a foam pad.

2. Description of the Related Art

In a seat for a vehicle and the like, there has been proposed a seat in which a decorative belt (also known as an accent line) having a belt shape is added to the seat and the design in appearance is considered.

As a prior art of the present technical field, there is JP-A No. 2017-030698 for example. In JP-A No. 2017-030698, there is disclosed a vehicular seat including a cushion seat or a seat back formed by covering the surface of a urethane pad with a trim cover, in which the trim cover is formed by sewing up plural trim covers and a sewn portion of the trim cover is bonded to a recess of the urethane pad by an adhesive along the shape of the recess.

SUMMARY OF INVENTION

In JP-A No. 2017-030698, as the sewing part of the trim cover, the end parts of two trim covers are folded back respectively, respective parts that are superposed in two layers and the sheet-like hot melt adhesive are sewn up to each other, the adhesive is molten by steam, and the sewing part of the trim cover is bonded to the mold pad. Therefore, the bonding plane becomes the front side of the trim cover. Here, as the raw material of the trim cover, there are fabric (textile), leather, and the like. However, in JP-A No. 2017-030698, no consideration is given on that, in the case of leather, bonding is hard because the surface is hardly impregnated with an adhesive.

The present invention has been achieved in view of these problems, and its object is to provide a seat in which a sewing part of a trim cover can be bonded to a foam pad even when the trim cover is of leather.

In view of the background art and the problems described above, an example of the present invention is a seat formed by bonding a trim cover to a foam pad, in which the trim cover includes a sewing part where plural trim covers are sewn up, raw material that is impregnated with an adhesive is sewn to the sewing part, and the foam pad and the raw material having been sewn are configured to be bonded to each other by the adhesive.

According to the present invention, such seat can be provided that a sewing part of a trim cover can be bonded to a foam pad even when raw material of the trim cover is leather.

DESCRIPTION OF PREFERRED EMBODIMENTS

Below, an embodiment of the present invention will be explained using the drawings.

Embodiment

Figure 2:
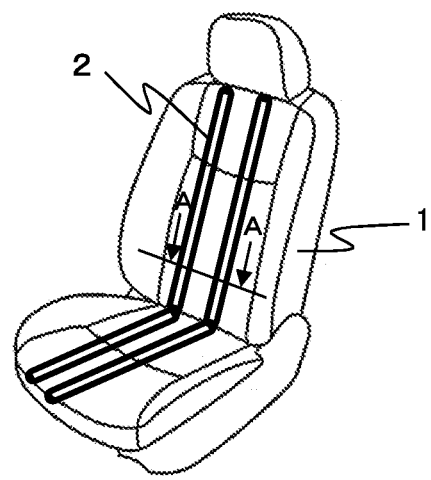
FIG. 2 is an outline view of a vehicular seat in an embodiment and a prior art.

First, an appearance of a vehicular seat becoming a premise of the present embodiment will be explained using FIG. 2. FIG. 2 is an outline view of a vehicular seat in a prior art and the present embodiment. The vehicular seat includes a seat back (backrest section) and a seat cushion (seat section), and the surface of the seat back and the seat cushion is covered by a trim cover 1 that is skin material where a sheet-like cover is sewn. Also, the reference sign 2 represents an accent line that is a decorative band as a design expression formed on the upper surface of the seat cushion in order to improve the design property.

Figure 3A:
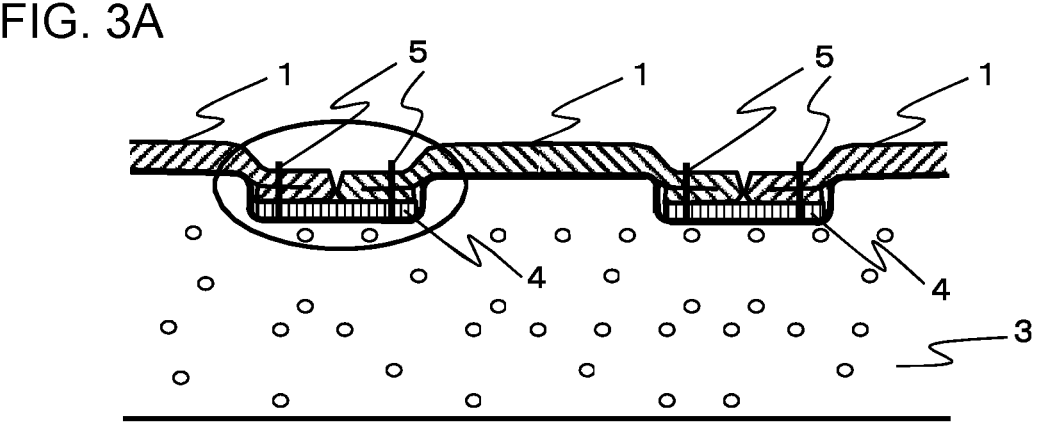
FIGS. 3A-3B are explanatory drawings of a forming process of an accent line in a prior art.
Figure 3B:
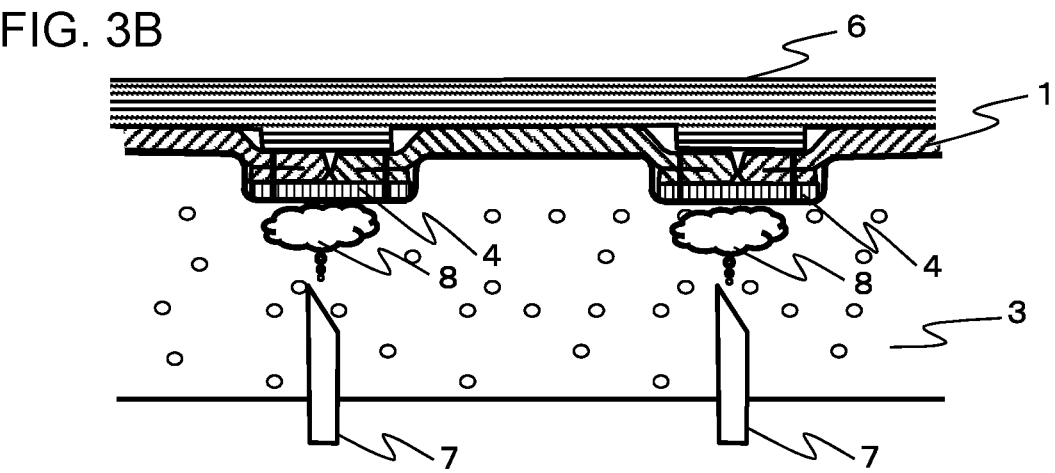

FIGS. 3A-3B are explanatory drawings of a forming process of an accent line of a prior art, and FIG. 3A shows a cross-sectional view taken from the plane A-A of FIG. 2. Also, FIG. 3B is a drawing that explains a process for manufacturing the accent line.

As shown in FIG. 3A, plural sheets of the trim covers are sewn up in order to form the accent line, and the sewn part is bonded to a mold pad 3 by an adhesive, the mold pad 3 being a molded foam pad. To be more specific, as the sewing part of the trim cover, a portion surrounded by an ellipse shown in FIG. 3A will be explained. That is to say, the end parts of two trim covers are folded back respectively, respective parts that are superposed in two layers and a sheet-like hot melt adhesive 4 are sewn up to each other to form a sewing part 5. As a process for manufacturing the accent line, as shown in FIG. 3B, the sewing part 5 is pressed to the mold pad 3 by a press mold 6, a steam nozzle 7 is inserted to the mold pad from the surface of the mold pad 3 opposite to the surface covered by the trim cover 1, the hot melt adhesive 4 is molten by heating steam 8 from the steam nozzle 7, and the sewing part 5 of the trim cover 1 is bonded to the mold pad 3. Accordingly, the bonding surface of the trim cover 1 against the mold pad 3 becomes the front side of the trim cover because the trim cover has been folded back. Here, although there are fabric (textile), leather, and the like as raw material of the trim cover, in the case of the leather, there is a problem that bonding becomes hard because the surface of the leather is hardly impregnated with an adhesive. That is to say, in the past, no consideration is given to a case raw material of the trim cover is leather such as synthetic leather or genuine leather.

Therefore, the present embodiment for solving the above problem will be explained below.

FIGS. 1A-1D are explanatory drawings of a forming process of an accent line in the present embodiment. Similarly to FIG. 3A-3B, FIGS. 1A-1D are cross-sectional views corresponding to the section A-A of FIG. 2. Also, the configuration same to that of FIG. 2 will be marked with same reference sign, and explanation thereof will be omitted.

Figure 1A:
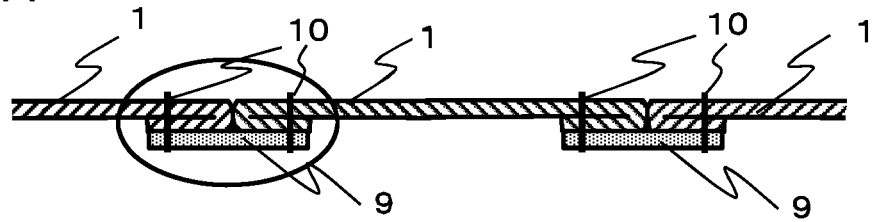
FIGS. 1A-1D are explanatory drawings of a forming process of an accent line in an embodiment.

First, the cross-sectional view of the sewing portion where plural sheets of the trim covers are sewn up in order to form the accent line in the present embodiment is shown in FIG. 1A. In FIG. 1A, in the present embodiment, as shown in a portion surrounded by an ellipse, the end parts of two trim covers are folded back respectively, respective parts that are superposed in two layers and a belt-like non-woven cloth 9 are sewn up to each other to form a sewing part 10.

Figure 1B:
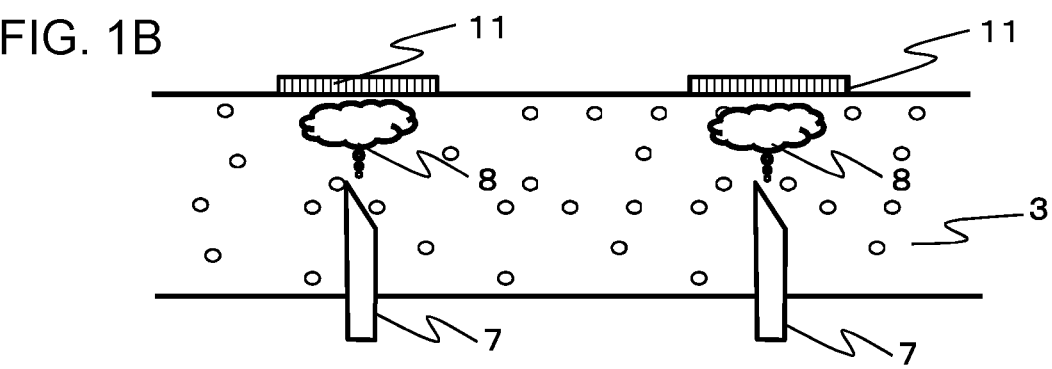

Also, FIG. 1B shows a cross-sectional view of a portion to which the sewing part 10 on the mold pad 3 side is bonded. As shown in FIG. 1B, an adhesive 11 is coated to the mold pad 3 beforehand. The adhesive 11 may be an adhesive in the form of liquid. Also, the adhesive 11 is molten and restored by the heating steam 8 from the steam nozzle 7, and the steam is stopped at timing when the adhesive 11 is molten.

Figure 1C:
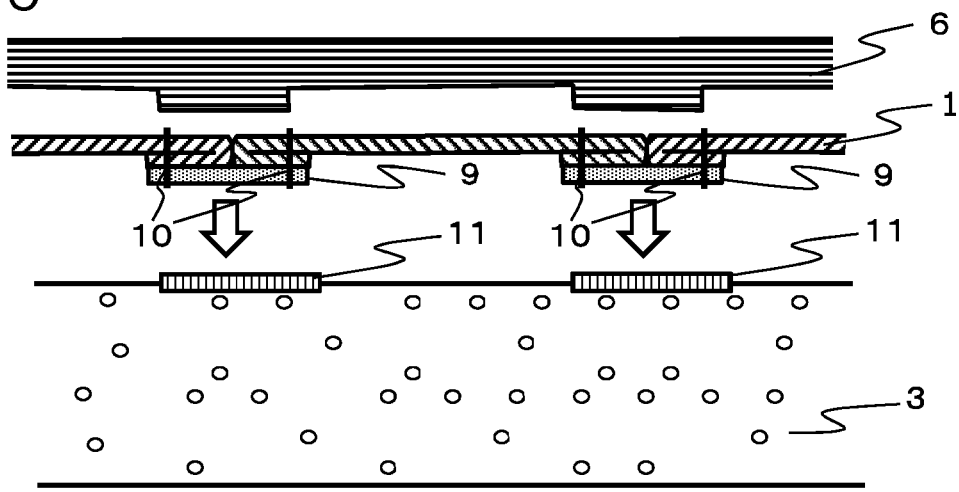
Figure 1D:
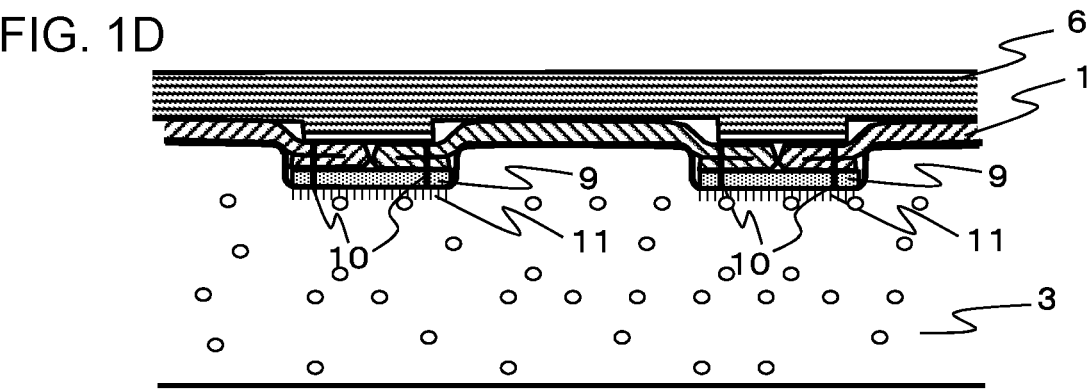

Further, as shown in FIGS. 1C and 1D, the sewing part 10 shown in FIG. 1A is pressed by the press mold 6 to a portion of the mold pad 3 where the adhesive 11 is molten. Thereby, as shown in FIG. 1D, by impregnation of the non-woven cloth 9 with the molten adhesive 11, the mold pad 3 and the sewing part 10 can be bonded to each other. That is to say, by sewing up a cloth such as a non-woven cloth which can be impregnated with an adhesive to the sewing part of the trim cover, the trim cover can be bonded even when raw material of the trim cover is leather such as synthetic leather or genuine leather which is not impregnated with an adhesive.

Also, when the trim cover is of genuine leather, there is a problem that, when heated steam is applied, hardening, shrinkage, discoloration, and the like may occur by heat or moisture of the heated steam. However, in the present embodiment, the heating steam is applied to the adhesive disposed on the mold pad 3 side, the steam is stopped at the timing when the adhesive is molten, the trim cover is thereafter pressed to the mold pad 3 to be bonded, therefore heat and moisture by the heating steam are hardly transferred to the trim cover, and the problem of hardening, shrinkage, discoloration, and the like by heat and moisture of a case the trim cover is of genuine leather can be solved.

Also, the non-woven cloth 9 forming the sewing part 10 only has to be of raw material that can be impregnated with an adhesive, may be of raw material having a mesh, hole, or gap where the adhesive can easily enter, and may be of raw material of urethane for example.

Also, the sewing part that forms the accent line may be a point or a plane other than a line.

Further, although explanation is made on a seat for a vehicle in the present embodiment, the present invention is not limited to it, can be applied to a marine vessel and an aircraft, and is applicable to a seat that is formed by bonding skin material to a foam pad.

Also, although it is explained above that the skin material covering the mold pad is the trim cover, the present invention is not limited to it, and is applicable even when the skin material and wadding for example form the trim cover.

Although the embodiment is explained above, the present invention is not limited to the embodiment described above, and includes various modifications. Also, the embodiment described above is explained in detail for easy understanding of the present invention, and the present invention is not necessarily limited to those including all configurations having been explained. Further, it is also possible that a part of the configuration of the embodiment is replaced by another configuration.

REFERENCE SIGNS LIST

1: Trim cover, 2: Accent line, 3: Mold pad, 4: Hot melt adhesive, 5: Sewing part, 6: Press mold, 7: Steam nozzle, 8: Heating steam, 9: Non-woven cloth, 10: Sewing part, 11: Adhesive

What is claimed is:

1. A seat formed by bonding a trim cover to a foam pad,
   wherein the trim cover includes a sewing part where a raw material is sewn to a plurality of trim cover portions, and
   the trim cover is bonded to the foam pad by adhesive that is impregnated in the sewn raw material and that bonds the sewn raw material to the foam pad.

2. The seat according to claim 1, wherein the trim cover portions are formed of leather.

3. The seat according to claim 1, wherein the raw material is a non-woven cloth.

4. The seat according to claim 1,
   wherein the sewing part is configured of end parts of two trim cover portions folded back respectively, with respective parts of the trim cover portions superposed in two layers and the raw material being sewn up to each other.

5. The seat according to claim 1, wherein the sewing part forms an accent line.

6. The seat according to claim 2, wherein the raw material is a non-woven cloth.

7. The seat according to claim 2,
   wherein the sewing part is configured of end parts of two trim cover portions folded back respectively, with respective parts of the trim cover portions superposed in two layers and the raw material being sewn up to each other.

8. The seat according to claim 2, wherein the sewing part forms an accent line.

9. The seat according to claim 3,
   wherein the sewing part is configured of end parts of two trim cover portions folded back respectively, with respective parts of the trim cover superposed in two layers and the raw material being sewn up to each other.

10. The seat according to claim 3, wherein the sewing part forms an accent line.

11. The seat according to claim 4, wherein the sewing part forms an accent line.

* * * * *